US011130713B2

(12) United States Patent
Yano et al.

(10) Patent No.: US 11,130,713 B2
(45) Date of Patent: Sep. 28, 2021

(54) CUBIC BORON NITRIDE SINTERED MATERIAL CUTTING TOOL

(71) Applicant: MITSUBISHI MATERIALS CORPORATION, Tokyo (JP)

(72) Inventors: Masahiro Yano, Naka (JP); Shirou Oguchi, Naka (JP); Yosuke Miyashita, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 492 days.

(21) Appl. No.: 16/303,540

(22) PCT Filed: May 22, 2017

(86) PCT No.: PCT/JP2017/019010
§ 371 (c)(1),
(2) Date: Nov. 20, 2018

(87) PCT Pub. No.: WO2017/204152
PCT Pub. Date: Nov. 30, 2017

(65) Prior Publication Data
US 2020/0317584 A1    Oct. 8, 2020

(30) Foreign Application Priority Data

May 23, 2016 (JP) .............................. JP2016-102676

(51) Int. Cl.
*C04B 35/5831* (2006.01)
*B23B 27/14* (2006.01)
(52) U.S. Cl.
CPC ........ *C04B 35/5831* (2013.01); *B23B 27/148* (2013.01); *B23B 2224/32* (2013.01);
(Continued)

(58) Field of Classification Search
CPC .......................... C04B 35/5831; B23B 27/148
See application file for complete search history.

(56) References Cited

U.S. PATENT DOCUMENTS 10,202,309 B2 *   2/2019   Yumoto ................ C04B 41/009
10,584,069 B2 *   3/2020   Yano ................... C04B 35/6264
(Continued)

FOREIGN PATENT DOCUMENTS

CN      101102863 A      1/2008
CN      101595075 A      12/2009
(Continued)

OTHER PUBLICATIONS

Chinese Office Action dated Oct. 14, 2019 for the corresponding Chinese Patent Application No. 201780027452.0.
(Continued)

*Primary Examiner* — Karl E Group
(74) *Attorney, Agent, or Firm* — Leason Ellis LLP

(57) ABSTRACT

A cBN sintered material cutting tool includes a cutting tool body that is made of a sintered material including cubic boron nitride particles and a binder phase, in which: an average particle size of the cBN particles is 0.5 μm or less and a content ratio of the cBN particles in the sintered material is 35 vol % to 80 vol %; and the binder phase includes 1.0 vol % to 20 vol % of an Al compound, an average particle size of the Al compound present in the binder phase is 300 nm or less, and a value of a ratio (a value of $S_N/S_O$; area ratio) of a content $S_N$ of nitrogen (N) included in the Al compound to a content $S_O$ of oxygen (O) included in the Al compound is 1.1 to 5.

5 Claims, 2 Drawing Sheets

(52) U.S. Cl.
CPC . *B23B 2226/125* (2013.01); *C04B 2235/3217* (2013.01); *C04B 2235/386* (2013.01); *C04B 2235/3813* (2013.01); *C04B 2235/3847* (2013.01); *C04B 2235/3865* (2013.01); *C04B 2235/3869* (2013.01); *C04B 2235/3886* (2013.01); *C04B 2235/5445* (2013.01); *C04B 2235/5454* (2013.01); *C04B 2235/781* (2013.01); *C04B 2235/785* (2013.01)

(56) References Cited

U.S. PATENT DOCUMENTS

| | | | |
|---|---|---|---|
| 2016/0236988 A1 | 8/2016 | Kobayashi | |
| 2017/0101346 A1* | 4/2017 | Yumoto | C04B 41/52 |
| 2018/0257995 A1* | 9/2018 | Yano | C04B 35/6264 |
| 2021/0001411 A1* | 1/2021 | Yano | B23B 27/148 |

FOREIGN PATENT DOCUMENTS

| | | | |
|---|---|---|---|
| CN | 104284747 A | | 1/2015 |
| CN | 104858458 A | | 8/2015 |
| CN | 105164086 A | | 12/2015 |
| EP | 2913317 A1 | | 9/2015 |
| JP | 06-001666 A | | 1/1994 |
| JP | 2000247746 A | * | 9/2000 |
| JP | 2011-189421 A | | 9/2011 |
| JP | 5189504 B | | 4/2013 |
| JP | 2014-083664 A | | 5/2014 |
| WO | WO-2015/060320 A | | 4/2015 |
| WO | WO-2015/147249 A | | 10/2015 |
| WO | WO-2016/084929 A | | 6/2016 |

OTHER PUBLICATIONS

European Search Report dated Jan. 3, 2020 for the corresponding European Patent Application No. 17802744.7.

International Search Report dated Aug. 8, 2017 for the corresponding PCT International Patent Application No. PCT/JP2017/019010.

* cited by examiner

CUBIC BORON NITRIDE SINTERED MATERIAL CUTTING TOOL

CROSS-REFERENCE TO RELATED PATENT APPLICATIONS

This application is a U.S. National Phase Application under 35 U.S.C. § 371 of International Patent Application No. PCT/JP2017/019010, filed May 22, 2017, and claims the benefit of Japanese Patent Application No. 2016-102676, filed on May 23, 2016, all of which are incorporated herein by reference in their entirety. The International Application was published in Japanese on Nov. 30, 2017 as International Publication No. WO/2017/204152 under PCT Article 21(2).

FIELD OF THE INVENTION

The present invention relates to a cubic boron nitride (hereinafter, referred to as "cBN") sintered material cutting tool (hereinafter, referred to as "cBN tool") including a cutting tool body made of a cBN sintered material that includes cBN as a major component and is obtained by sintering under an ultrahigh pressure at a high temperature, and particularly relates to a cBN sintered material cutting tool having excellent strength and toughness, having excellent fracturing resistance during cutting of high hardness steel such as alloy steel or bearing steel, and being capable of maintaining excellent cutting performance for a long-term usage.

BACKGROUND OF THE INVENTION

In the related art, as a cutting tool made of high hardness steel, for example, a cBN sintered material cutting tool including a cutting tool body made of a cBN sintered material is known, and various techniques thereof are disclosed in order to improve the tool life.

For example, Japanese Patent No. 5189504 discloses a cBN sintered material including a binder, in which the binder includes at least one selected from the group consisting of nitrides, carbides, borides, and oxides of group 4a elements, group 5a elements, and group 6a elements in the periodic table, and solid solutions thereof, at least one selected from the group consisting of simple substances of Zr, Si, Hf, Ge, W and Co, compounds thereof, and solid solutions thereof, and a compound of Al, a total weight of W and/or Co is lower than 1 wt %, a content of Si or Zr is 0.01 wt % or higher and lower than 0.5 wt %, Si/(Si+W+Co) or Zr/(Zr+W+Co) is 0.05 to 1.0, an average particle size of TiN or $TiB_2$ as a Ti compound is 100 nm to 400 nm, and an average particle size of $AlB_2$ or AlN as an Al compound is 50 nm to 150 nm. In the cBN sintered material having this configuration, strength and toughness are improved.

In addition, for example, Japanese Unexamined Publication No. 2011-189421 discloses a cutting tool including a cutting tool body made of a cBN sintered material including cBN, a heat insulating phase, and a binder phase, the heat insulating phase includes one or more first compounds that includes one or more elements selected from the group consisting of Al, Si, Ti, and Zr and one or more elements selected from the group consisting of N, C, O, and B, a content of the first compound in the cBN sintered material is 1 mass % to 20 mass %, an average particle size of the first compound is less than 100 nm, and a thermal conductivity of the cBN sintered material is 70 W/m·K or lower. In the cBN sintered material tool having this configuration, a decrease in the thermal conductivity of the cutting tool body and improvement in the hardness of the cutting tool body can be realized at the same time.

In addition, for example, Japanese Unexamined Publication No. H6-1666 discloses a cBN sintered material in which a cBN content is 80 vol % to 95 vol %, and a binder phase other than cBN is a compound including AlN, $TiB_2$, and $Al_2O_3$ as major components that is formed by a reaction between cBN, Al, and at least one selected from the group consisting of oxides of group 4a, 5a, and 6a transition metals in the periodic table. In the cBN sintered material having this configuration, cBN particles and the binder phase are strongly bonded to each other.

Technical Problem

Japanese Patent No. 5189504 discloses a cBN sintered material that includes a predetermined amount of W and/or Co, Si, or Zr as the binder, in which the particle growth of the Ti compound or the Al compound is suppressed by Si, and the average particle size of TiN or $TiB_2$ and the average particle size of $AlB_2$ or AlN are adjusted to be in predetermined ranges. In the cBN sintered material having this configuration, fracturing resistance and wear resistance are improved. As shown in Table 1 of Japanese Patent No. 5189504, this sintered material is effective in a case where the binder phase does not include an oxide. However, in a case where the binder phase includes an oxide, in particular, an Al oxide, Si reacts with oxygen and an Al oxide that are inevitably incorporated such that a compound including $Al_2O_3$ and SiO2, for example, mullite $(3Al_2O_3 \cdot 2SiO_2)$ is likely to be formed. In addition, it is difficult to control the particle size of the Ti compound or the Al compound. Further, cracks initiate and propagate from a compound including coarse $Al_2O_3$ and SiO2 formed in the binder phase, and thus the toughness of the cBN sintered material deteriorates.

In addition, Japanese Unexamined Publication No. 2011-189421 discloses a cBN sintered material in which fine cBN particles are used, the first compound that includes one or more elements selected from the group consisting of Al, Si, Ti, and Zr and one or more elements selected from the group consisting of N, C, O, and B is used as the heat insulating phase, and the thermal conductivity is 70 W/m·K or lower. This sintered material is effective in a cutting environment in which the temperature of a work material is insufficient due to low chip ductility during cutting of a sintered alloy or the like. However, during cutting of high hardness steel in which a tool edge tip is at a higher temperature than that of a sintered alloy, an increase in the temperature of the edge tip is high, chemical wear is likely to progress, and the fracturing resistance of the cBN sintered material deteriorates.

In addition, Japanese Unexamined Publication No. H6-1666 discloses a cBN sintered material in which a cBN content is 80 vol to 95 vol, and a binder phase other than cBN is a compound including AlN, $TiB_2$, and $Al_2O_3$ as major components that is formed by a reaction between cBN, Al, and at least one selected from the group consisting of oxides of group 4a, 5a, and 6a transition metals in the periodic table. In the cBN sintered material having this configuration, cBN particles and the binder phase are strongly bonded to each other. In the sintered material, the cBN particles and the binder phase are strongly bonded to each other, and thus the cBN particles react with Al and an oxide. As a result, a reaction product is formed in contact with the cBN particles. In a case where the cBN content is high, a region of the binder phase surrounded by adjacent cBN particles is narrow. This reaction product has a smaller particle size than the cBN particles, and thus is less effective. However, in a case where the cBN content is low, a region of the binder phase surrounded by adjacent cBN particles is wide. Therefore, the particle size of the reaction product that is formed in contact with the cBN particles is likely to increase. In a case where the cBN sintered material is used as a tool, this coarse reaction product may cause fracturing that originates from surface unevenness of an edge tip occurring when cBN particles peel off from a tool surface. In addition, in a case where cBN particles having a small particle size are used in order to suppress chipping, a reaction product having a size that has a non-negligible effect on the size of the cBN particles is formed. In the reaction product, cracks are likely to propagate into particles of, in particular, AlN having a low hardness. Further, in a case where cBN particles having an effect of preventing the propagation of cracks are fine, cracks propagated to the vicinity of the cBN particles are induced into coarse AlN particles in contact with the cBN particles and are likely to propagate into the AlN particles. As a result, the crack propagation suppressing effect of the cBN particles deteriorates. Thus, the toughness of the cBN sintered material deteriorates, and in a case where the cBN sintered material is used as a tool, fracturing resistance deteriorates. In addition, in a case where oxides of group 4a, 5a, and 6a transition metals in the periodic table are used as raw materials, the cBN content decreases. In this state, in a case where a proportion of the binder phase in the cBN sintered material increases, the amount of the oxides of group 4a, 5a, and 6a transition metals in the periodic table in the sintered material also increases. As a result, a proportion of the oxide not in contact with the cBN particles that reacts in the binder phase increases, and a region including a large amount of the oxide increases in the binder phase. Therefore, the dispersibility of components constituting the binder phase deteriorates, and the hardness or toughness of the cBN sintered material deteriorates. As a result, in a case where the sintered material is used as a tool, the fracturing resistance deteriorates.

Therefore, a technical subject to be achieved by the present invention, that is, an object of the present invention is to provide a cBN sintered material cutting tool in which chipping or fracturing of a tool edge tip is not likely to occur even during cutting of high hardness steel where high-load cutting conditions are required and excellent cutting performance is maintained for a long period of time.

SUMMARY OF THE INVENTION

Solution to Problem

In order to achieve the object, the present inventors conducted a thorough investigation focusing on a binder phase structure of a cBN sintered material constituting a cBN tool, and thus found that a cBN sintered material having high toughness in which fine cBN base powder is used can be obtained by adjusting an average particle size of cBN particles in the cBN sintered material to be 0.5 µm or less, adjusting a content of an Al compound included in a binder phase to be 1.0 vol % to 20 vol %, adjusting an average particle size of the Al compound (that is, particles formed of the Al compound phase) formed in the binder phase to be 300 nm or less, and adjusting a ratio $S_N/S_O$ (atomic ratio) of the N content $S_N$ in the Al compound (phase) to the oxygen (O) content $S_O$ in the Al compound (phase), which is calculated from an element mapping image obtained by observation of a structure cross-section, to be 1.1 to 5 such that a ratio between the contents of an Al nitride and an Al oxide having different hardnesses or different thermal expansion coefficients in the Al compound (phase) of the binder phase of the sintered material is controlled and such that the induction of fine propagation of cracks in the binder phase caused by high dispersion of the Al compound in the binder phase is strengthened.

Accordingly, in a cBN tool including a cutting tool body made of the cBN sintered material, the toughness is high and fracturing is not likely to occur during cutting of high hardness steel where a high load and a high temperature are applied to an edge tip. As a result, excellent cutting performance can be exhibited for a long-term usage.

The present inventors found that, in order to obtain the cBN sintered material having excellent toughness and fracturing resistance, it is important to control the particle size of the Al compound in the binder phase and the ratio between the contents of an Al nitride and an Al oxide.

That is, during the manufacturing of a cBN sintered material in which a binder phase including a ceramic as a major component is used, in the related art, Ti or Al which is highly reactive with cBN particles other than a Ti compound as a main binder phase and cBN powder is used for a cBN sintered material base powder such that a reaction product such as AlN, $TiB_2$, or $Al_2O_3$ is inevitably formed in contact with the cBN particles instead of increasing the adhesion strength between the cBN and the binder phase.

Regarding AlN having a low hardness and a low thermal expansion coefficient among the reaction products, even in a case where a main binder phase where cBN and cBN form a strong network is a metal binder phase or a ceramic binder phase, the particle size of AlN having a low hardness does not increase under conditions where the cBN content is 80 vol % or higher and a binder phase region surrounded by adjacent cBN particles is narrow. Therefore, when this cBN sintered material is used as a tool, in a case where cracks initiated or propagated from AlN particles having exposed surfaces propagate into AlN particles, the propagation is highly likely to be prevented by cBN particles near the AlN particles, and there is little effect on the toughness of the cBN sintered material. However, in a case where the major component of the binder phase is a ceramic and the cBN content is lower than 80 vol %, a binder phase region surrounded by adjacent cBN particles is wide. Therefore, the particle size of AlN formed in contact with the cBN particles is likely to be large, and when cBN particles having a small particle size are used, the size of AlN has a non-negligible effect on the particle size of the cBN particles, and propagated cracks are likely to propagate into the AlN particles. Further, in a case where cBN particles having an effect of preventing the propagation of cracks are fine, cracks propagated to the vicinity of the cBN particles are induced into coarse AlN particles in contact with the cBN particles, and thus the crack propagation suppressing effect of the cBN particles deteriorates. As a result, there is an adverse effect on the toughness of the cBN sintered material.

The present inventors found that, in a case where fine cBN particles are used, a path of cracks propagating in the binder phase through AlN having a low hardness can be reduced by forming an AlN film having an extremely small thickness on cBN particle surfaces, for example, using an atomic layer deposition method (ALD method; a deposition method of causing a molecule of a raw material compound to react with a base material in a vacuum chamber per layer and repeating purge by Ar or nitrogen; one of CVD methods) and heating the AlN film in a vacuum to perform a pre-treatment on a cBN raw material, and then mixing the pre-treated cBN raw material and a binder phase forming component with each other using a ball mill while peeling off AlN from the cBN particles and mixing AlN into the binder phase component such that AlN is highly dispersed in the binder phase. Further, it was found that an increase in the propagation path of cracks in the binder phase and the propagation of cracks to an Al nitride having a low hardness can be induced and a cBN sintered material having high toughness can be obtained by highly dispersing an Al oxide, which is largely different from an Al nitride in hardness and thermal expansion coefficient although it is an Al compound, in the binder phase component and controlling a ratio between the Al nitride and the Al oxide in the binder phase.

Further, it was found that, by performing the above-described pre-treatment on the cBN particles, impurity components such as oxygen attached and adsorbed on the cBN particle surfaces are diffused into the AlN film and are captured in the AlN film; therefore, cBN particles having a high surface cleanliness from which the impurity components such as oxygen adsorbed on the cBN surfaces are removed can be obtained. As a result, it was found that the adhesion strength between the cBN particles and the binder phase can be improved and a cBN sintered material having high toughness can be obtained.

A cBN tool prepared from the cBN sintered material exhibits excellent toughness and fracturing resistance during cutting of high hardness steel where a high load and a high temperature are applied to an edge tip.

The present invention is made based on the above-described knowledge and has the following aspects.

(1) A cubic boron nitride sintered material cutting tool comprising a cutting tool body that is made of a sintered material including cubic boron nitride particles and a binder phase, in which:

(a) an average particle size of the cubic boron nitride particles is 0.5 μm or less and a content ratio of the cubic boron nitride particles in the sintered material is 35 vol % to 80 vol %; and (b) the binder phase includes 1.0 vol % to 20 vol % of an Al compound, an average particle size of the Al compound present in the binder phase is 300 nm or less, and a value of a ratio (a value of $S_N/S_O$; atomic ratio) of a content $S_N$ of nitrogen (N) included in the Al compound to a content $S_O$ of oxygen (O) included in the Al compound is 1.1 to 5.

(2) The cubic boron nitride sintered material cutting tool according to (1), in which a content ratio of the cubic boron nitride particles in the sintered material is 45 vol % to 80 vol %.

(3) The cubic boron nitride sintered material cutting tool according to (1), wherein a content ratio of the cubic boron nitride particles in the sintered material is 70 vol % to 80 vol %.

(4) The cubic boron nitride sintered material cutting tool according to any one of (1) to (3), in which an average particle size of the cubic boron nitride particles is 0.05 μm or more.

(5) The cubic boron nitride sintered material cutting tool according to any one of (1) to (4), in which an average particle size of the Al compound present in the binder phase is 10 nm or more.

Advantageous Effects of Invention

The cBN sintered material cutting tool according to the present invention includes a cutting tool body that is made of a sintered material including cBN particles and a binder phase, in which: an average particle size of the cBN particles is 0.5 μm or less and a content ratio of the cBN particles in the cBN sintered material is 35 vol % to 80 vol %; and the binder phase includes 1.0 vol % to 20 vol % of an Al compound, an average particle size of the Al compound present in the binder phase is 300 nm or less, and a value of a ratio $S_N/S_O$ (area ratio) of a content $S_N$ of nitrogen (N) included in the Al compound to a content $S_O$ of oxygen (O) included in the Al compound is 1.1 to 5. With this configuration, the content of the oxygen (O) in the cBN sintered material can be reduced, and the average particle size of the Al compound formed in the cBN sintered material can be reduced. Therefore, a local and excessive reaction between the cBN particles and the binder phase in the sintered material was suppressed, an interfacial adhesion strength between cBN particles and the binder phase can be improved, and a cBN sintered material having high toughness can be obtained.

As a result, a cBN tool according to one aspect of the present invention (hereinafter, referred to as "cBN tool according to the present invention") prepared from the cBN sintered material exhibits excellent toughness, fracturing resistance, and wear resistance during cutting of high hardness steel where a high load and a high temperature are applied to an edge tip.

DETAILED DESCRIPTION OF THE INVENTION

As a part of an embodiment of the present invention, a configuration of the present invention will be described below.

Average Particle Size of cBN Particles:

An average particle size of cBN particles in a cBN sintered material of a cBN tool according to the present invention is 0.5 μm or less. The reason for this is that, by increasing an interface between cBN particles and a binder phase in the cBN sintered material, the toughness of the cBN sintered material is improved, and the fracturing resistance of the cBN tool is improved.

In the present invention, fracturing or chipping that originates from surface unevenness of an edge tip occurring when cBN particles peel off from a tool surface during the use of the tool can be suppressed, and propagation of cracks from an interface between the cBN particles and the binder phase caused by stress applied to the edge tip during the use of the tool or propagation of cracks caused by the fracturing of the cBN particles can be suppressed. As a result, the fracturing resistance of the cBN tool can be improved.

Accordingly, the average particle size of the cBN particles in the cBN sintered material of the cBN tool according to the present invention is in a range of 0.5 µm or less and preferably in a range of 0.05 to 0.35 µm.

Figure 1:
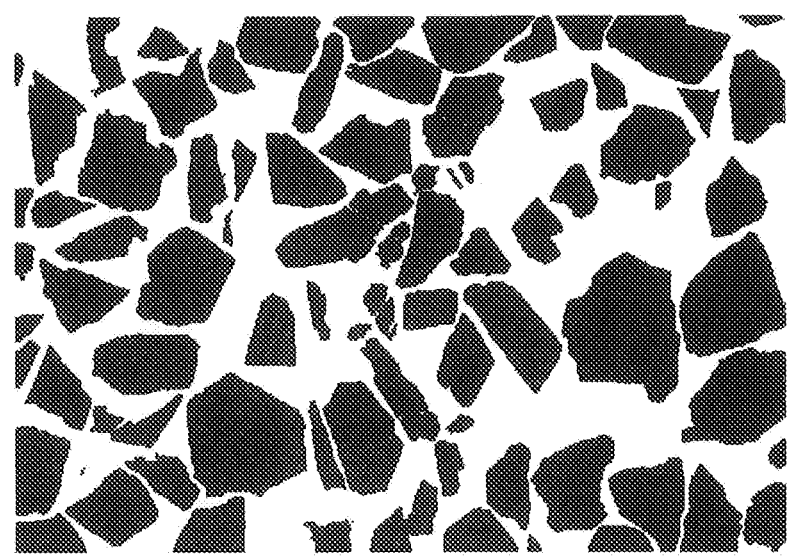
FIG. 1 is a diagram illustrating an example of a binary image of a cBN particle portion extracted from a secondary electron image obtained by observing a cross-sectional structure of a cBN sintered material according to the present invention with a SEM, in which a black portion in the binary image corresponds to a cBN particle.

Here, the average particle size of the cBN particles can be obtained as follows. A secondary electron image is obtained by observing a cross-sectional structure of the cBN sintered material with an SEM. A portion of the cBN particles in the obtained image is extracted by image processing as illustrated in FIG. 1, maximum lengths of the respective particles are obtained by image analysis, and an average particle size is calculated based on the maximum lengths.

In a case where the portion of the cBN particles in the image is extracted by image processing, in order to clearly determine the cBN particles and the binder phase, the image is displayed in monochrome (256 gradations with 0 as black and 255 as white), and is binarized using an image in which a ratio between a pixel value of the cBN particle portion and a pixel value of the binder phase portion is 2 or higher such that the cBN particles are displayed black.

An average value is obtained from a region of about 0.5 µm×0.5 µm as a region for obtaining the pixel value of the cBN particle portion or the binder phase portion, and it is desirable that an average value obtained from at least three different regions of the same image is used as each contrast.

After the binarization, cBN particles that appear to be in contact with each other are separated from each other using a treatment of separating a portion where cBN particles appear to be in contact with each other, for example, using watershed which is one image processing operation.

A portion (black portion) corresponding to a cBN particle in the image obtained after the binarization is analyzed to obtain a maximum length thereof, the obtained maximum length is set as a maximum length of each particle, and the maximum length of each particle is set as a diameter of each particle. In the particle analysis for obtaining the maximum length, for example, Feret diameters are calculated from one cBN particle to obtain two lengths, a larger value among the obtained two lengths is defined as a maximum length, and this value is obtained as a diameter of each particle. Based on the volume of each particle that is calculated from the above diameter, a graph in which the vertical axis represents the volume percentage [%] and the horizontal axis represents the diameter [µm] is drawn. A value corresponding to a volume percentage of 50% is obtained as an average particle size of cBN particles in one image, and an average value of values that are obtained by processing at least three images in a secondary electron image obtained by observation using a SEM at a magnification of 20000 is obtained as an average particle size [µm] of cBN. During the particle analysis, a length (µm) per pixel is set using a scale value obtained using a SEM in advance. In a case where the average particle size of the cBN particles is 0.3 µm, a visual field region of about 5.0 µm×3.0 µm is desirable as an observation region used for the image processing.

Content Ratio of cBN Particles in cBN Sintered Material:

Typically, a cBN sintered material includes cBN particles and a binder phase component as hard components. In the present invention, in a case where a content ratio of the cBN particles is lower than 35 vol %, the amount of a hard material in the sintered material is small, and the hardness of the cBN tool is not sufficient. On the other hand, in a case where the content ratio of the cBN particles is 80 vol % or higher, a proportion of the binder phase in the sintered material is relatively low, and the effect of improving toughness obtained by the binder phase is not sufficient. Therefore, in order for the cBN sintered material according to the present invention to obtain a predetermined hardness and a predetermined toughness, the content ratio of the cBN particles in the cBN sintered material is in a range of 35 vol % to 80 vol %.

It is more preferable that the content ratio of the cBN particles in the cBN sintered material is in a range of 45 vol % to 80 vol %. It is still more preferable that the content ratio of the cBN particles in the cBN sintered material is in a range of 70 vol % to 80 vol %.

The content ratio of the cBN particles in the cBN sintered material is obtained by observing a cross-sectional structure of the cBN sintered material with a SEM to obtain a secondary electron image, extracting a portion of cBN particles in the obtained secondary electron image by image processing, calculating an area of the cBN particles by image analysis, obtaining a proportion of cBN particles in one image, processing at least three images to obtain values, and obtaining an average value of the values as the content ratio of the cBN particles. For example, in a case where the average particle size of the cBN particles is 0.3 µm, a visual field region of about 5.0 µm×3.0 µm is desirable as an observation region used for the image processing.

Content of Al Compound in Binder Phase of cBN Sintered Material:

In a case where the content of the Al compound (for example, both $Al_2O_3$ and AlN, or $Al_2O_3$, AlN, and one or two or more selected from the group consisting of AlON, SiAlON, and $AlB_2$) included in the binder phase of the cBN sintered material is lower than 1 vol %, a reaction between the cBN particles and the binder phase is small, an interfacial adhesion strength between the cBN and the binder phase is not sufficiently obtained, and thus the strength of the sintered material decreases. On the other hand, in a case where the content of the Al compound included in the binder phase of the cBN sintered material is higher than 20 vol %, the content of the Al compound included in the binder phase is excessively high. Therefore, the hardness of the sintered material decreases, and the fracturing resistance deteriorates.

Accordingly, the content of the Al compound included in the binder phase of the cBN sintered material is 1 vol % to 20 vol %.

The content of the Al compound in the binder phase of the cBN sintered material is the content ratio of the Al compound (phase) in the binder phase.

Average Particle Size of Al Compound in Binder Phase:

In a case where the average particle size of the Al compound (for example, both $Al_2O_3$ and AlN, or $Al_2O_3$, AlN, and one or two or more selected from the group consisting of AlON, SiAlON, and $AlB_2$) present in the binder phase is more than 300 nm, the initiation or propagation of cracks from the Al compound particles in the binder phase is likely to occur, and thus the toughness of the cBN sintered material deteriorates.

Accordingly, the average particle size of the Al compound present in the binder phase is 300 nm or less and preferably 150 nm or less.

In a case where the particle size of the Al compound is less than 10 nm, the particle size exceeds a measurement limit. In addition, in a case where the particle size of the Al compound is less than 10 nm, there are adverse effects on the characteristics of the cBN sintered material. Therefore, in order to obtain the average particle size, a minimum value of the particle size of the Al compound measured in the present invention is set as 10 nm.

In order to measure the average particle size of the Al compound, an Al mapping image is obtained by performing Auger electron spectroscopy (AES) on the cross-sectional structure of the cBN sintered material. A portion of the Al compound in the obtained image is extracted by image processing, maximum lengths of respective particles are obtained by image analysis, and an average particle size is calculated based on the maximum lengths. In the image analysis, for example, the maximum length can be obtained by obtaining Feret diameters of each particle.

Al compound particles that appear to be in contact with each other are separated from each other using a treatment of separating a portion where Al compound particles appear to be in contact with each other, for example, using watershed which is one image processing operation.

In order to calculate the average particle size of the Al compound, a maximum length of each particle is obtained from the Al mapping image as the diameter of each particle. Based on the volume of each particle that is calculated from the above diameter, a graph in which the vertical axis represents the volume percentage [%] and the horizontal axis represents the diameter [μm] is drawn. A value corresponding to a volume percentage of 50% is obtained as an average particle size of the Al compound in one image, and an average value of values that are obtained by processing at least three images in an Al mapping image obtained by AES at a magnification of 20000 is obtained as an average particle size [μm] of the Al compound. During the particle analysis, a length (μm) per pixel is set using a scale value obtained by AES in advance. A visual field region of about 5.0 μm×3.0 μm is desirable as an observation region used for the image processing.

Ratio of Content $S_N$ of Nitrogen (N) Included in Al Compound to Content $S_O$ of Oxygen (O) Included in Al Compound (Value of $S_N/S_O$; Area Ratio):

In a case where a ratio of a content $S_N$ of nitrogen (N) included in the Al compound to a content $S_O$ of oxygen (O) included in the Al compound (a value of $S_N/S_O$; an area ratio) is lower than 1.1, a proportion of an Al nitride inducing propagation of cracks in the binder phase is low, and cracks propagate linearly without propagating finely in the binder phase. As a result, the toughness of the cBN sintered material deteriorates. On the other hand, in a case where the value of $S_N/S_O$ is higher than 5, the content of the Al compound in the cBN sintered material increases, and the fracturing resistance deteriorates due to a decrease in hardness.

Accordingly, the ratio of the content $S_N$ of nitrogen (N) included in the Al compound to the content $S_O$ of oxygen (O) included in the Al compound (a value of $S_N/S_O$; an area ratio) is 1.1 to 5 and preferably 2 to 4.5.

Figure 2:
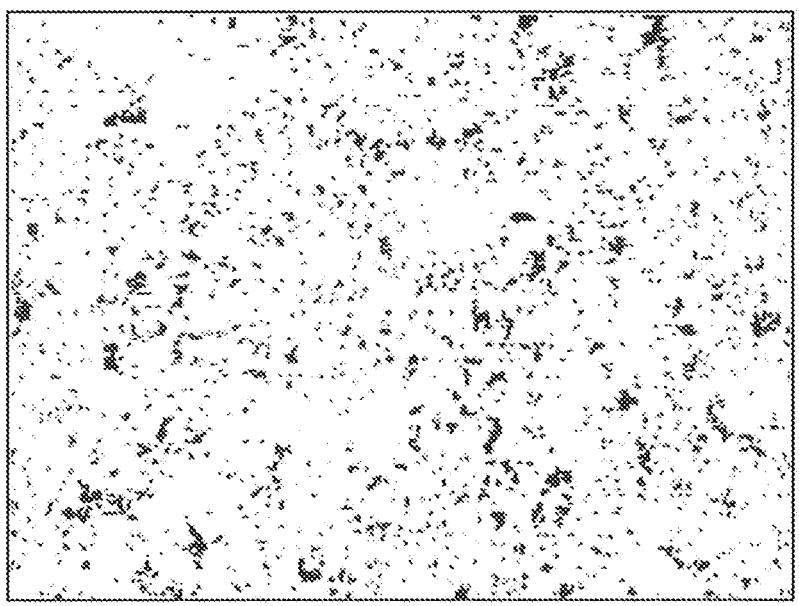
FIG. 2 is a diagram illustrating an example of an element mapping image of nitrogen (N) (a portion where an Al mapping image and nitrogen (N) overlap with each other) included in an Al compound that is obtained by performing AES on the cBN sintered material cross-section, that is, a mapping image of a portion (black portion) of AES where Al and nitrogen overlap with each other, in which an area ratio of black portions to a total area of the mapping image illustrated in FIG. 2 is 8.30 area %.
Figure 3:
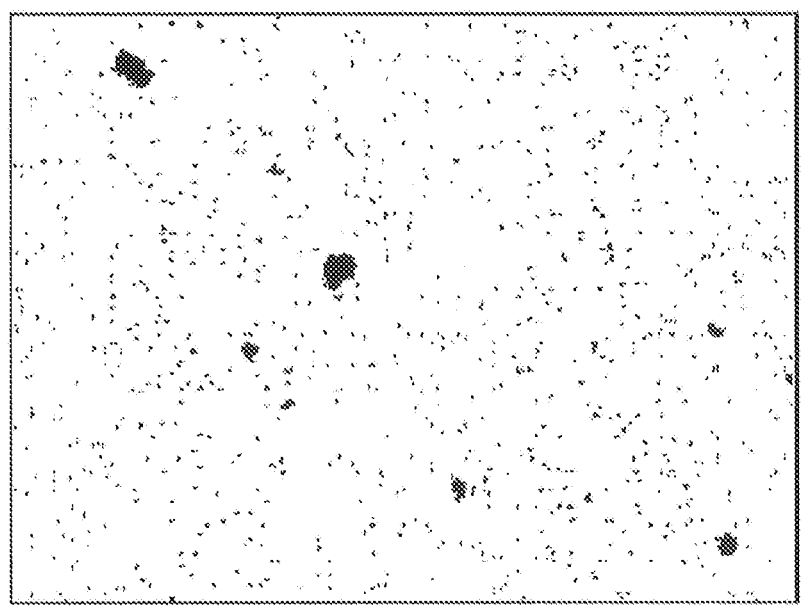
FIG. 3 is a diagram illustrating an example of an element mapping image of oxygen (O) (a portion where an Al mapping image and oxygen (O) overlap with each other) included in the Al compound that is obtained by performing AES on the cBN sintered material cross-section, that is, a mapping image of a portion (black portion) of AES where Al and oxygen overlap with each other, in which an area ratio of black portions to a total area of the mapping image illustrated in FIG. 3 is 3.67 area %.

Method of Measuring Ratio of Content $S_N$ of Nitrogen (N) included in Al Compound to Content $S_O$ of Oxygen (O) included in Al Compound (Value of $S_N/S_O$; Area Ratio):

In order to measure the ratio $S_N/S_O$ of the content $S_N$ of nitrogen (N) included in the Al compound to the content $S_O$ of oxygen (O) included in the Al compound, a cross-sectional structure of the prepared cBN sintered material is observed using Auger electron spectroscopy (AES), and an Al mapping image, a nitrogen (N) mapping image, and an oxygen (O) mapping image are obtained. In each of the obtained images, a portion where the Al mapping image and nitrogen (N) overlap with each other and a portion where the Al mapping image and oxygen (O) overlap with each other are extracted by image processing as illustrated in FIG. 2 or 3, areas thereof are calculated by image analysis, and a proportion of each of the areas in one image is obtained. Using the obtained values, a ratio $S_{N1}/S_{O1}$ of a content $S_{N1}$ of nitrogen (N) included in the Al compound to a content $S_{O1}$ of oxygen (O) included in the Al compound is calculated. An average value of values obtained by processing at least three images is obtained as the ratio $S_N/S_O$ (area ratio) of the content $S_N$ of nitrogen (N) included in the Al compound to the content $S_O$ of oxygen (O) included in the Al compound. A visual field region of about 5.0 μm×3.0 μm is desirable as an observation region used for the image processing.

Hereinafter, the cBN sintered material cutting tool according to the present invention will be described in detail based on Examples.

Examples

During the manufacturing of a cBN sintered material according to Example, cBN particles having pre-treated surfaces were used as a cBN raw material.

First, for example, an AlN film was formed on the cBN particle surfaces using an ALD method. During the film formation, a fluidized bed was charged with the cBN particles, the inside of the furnace was heated to about 350° C., and one cycle was repeated until a desired AlN film thickness was obtained, the cycle including an Ar+Al(CH$_3$)$_3$ gas inflow step, an Ar gas purge step, an Ar+NH$_3$ gas inflow step, and an Ar gas purge step. For example, by performing the film formation for 60 minutes, the AlN film having a thickness of about 10 nm was able to be coated and formed on the cBN particle surfaces.

Next, the cBN particles having the surfaces on which the AlN film having the desired thickness was formed were heated in a vacuum at about 1000° C. such that impurity elements such as oxygen on the cBN surface were diffused into the AlN film and were captured in the AlN film.

By performing the heat treatment as described above, the AlN film in which the impurity elements were captured were peeled off from the cBN surfaces due to ball mill mixing after the heat treatment. As a result, cBN particles having a high surface cleanliness from which the impurity components such as oxygen adsorbed on the cBN surfaces were removed were able to be obtained.

As shown in Table 1, cBN particles in which the thickness of the AlN film was 10 nm and cBN particles in which the thickness of the AlN film was 35 nm were prepared, respectively, and were heated in a vacuum at about 1000° C. As a result, cBN powders with the AlN film were obtained. Regarding the cBN powder in which the thickness of the AlN film was 10 nm, a heat treatment at about 400° C. was performed in addition to the heat treatment at about 1000° C. As a result, cBN powders with the AlN film having different surface cleanlinesses were obtained.

The cBN particle powder having an average particle size of 0.5 μm or less that was pre-treated as described above and TiN powder, TiC powder, Al powder, TiAl$_3$ powder, Al$_2$O$_3$ powder, and Si$_3$N$_4$ powder having an average particle size in a range of 0.3 to 0.9 μm were prepared as base powders for forming a binder phase. Some base powders selected from the base powders and the cBN particle powder were blended such that a content ratio of the cBN particle powder was 35 to 80 vol % with respect to the total amount of the powders as 100 vol %, were mixed with each other in a wet process, and were dried.

Next, this mixed powder was press-molded by hydraulic pressing into a green compact having a diameter of 50 mm and a thickness of 1.5 mm at a molding pressure of 1 MPa. Next, this green compact underwent a heat treatment by being held at a predetermined temperature in a range of 1000° C. to 1300° C. in a vacuum atmosphere under a pressure of 1 Pa for 30 to 60 minutes.

Next, the green compact on which the above-described heat treatment was performed was superimposed on a support piece made of WC-based cemented carbide including 8 mass % of Co and a balance of WC and having a diameter of 50 mm and a thickness of 2 mm that was prepared separately. In this state, the green compact was charged into a typical ultra-high pressure sintering apparatus and was sintered under typical conditions of pressure: 3 to 10 GPa, for example, 5 GPa, temperature: 1400° C., and holding time: 30 minutes. As a result, cBN sintered materials 1 to 15 according to the present invention (hereinafter, also referred to as "sintered materials according to the present invention") shown in Table 2 were prepared.

The heat treatment was performed on the green compact mainly in order to remove a solvent during the wet mixing.

In addition, in the preparation steps, it is preferable that the oxidation of the base powders is prevented in the steps until the ultra-high pressure sintering. Specifically, it is preferable that the base powders were handled in a non-oxidation protective atmosphere.

For comparison, cBN particle powder having an average particle size of 0.5 μm or less that was pre-treated as shown in Table 1, cBN particle powder having an average particle size of about 1.5 μm or less that was prepared under conditions other than the conditions defined in the present invention, TiN powder, TiC powder, Al powder, $TiAl_3$ powder, $Al_2O_3$ powder, AlN powder, and $Si_3N_4$ powder having an average particle size in a range of 0.3 to 0.9 μm that were base powders for forming a binder phase, cBN particle powder having an average particle size of 0.5 μm or less that was not heated, and TiN powder, TiC powder, Al powder, $TiAl_3$ powder, $Al_2O_3$ powder, AlN powder, and $Si_3N_4$ powder having an average particle size in a range of 0.3 to 0.9 μm that were base powders for forming a binder phase were prepared. Some base powders selected from the base powders and the cBN particle powder were blended such that a content ratio of the cBN particle powder was 21 to 85 vol % with respect to the total amount of the powders as 100 vol %, were mixed with each other in a wet process, and were dried.

Next, a green compact was prepared under the same conditions as those of the sintered materials 1 to 15 according to the present invention and was heated. This green compact was sintered under an ultrahigh pressure at a high temperature under the same conditions as those of sintered materials 1 to 15 according to the present invention. As a result, cBN sintered materials according to Comparative Examples (hereinafter, referred to as "comparative sintered materials") 1 to 11 shown in Table 3 were prepared.

The comparative sintered materials 1 to 5 were cBN sintered materials in which base powders that were not heated were used. The comparative sintered materials 6 and 11 were cBN sintered materials in which the cBN content was outside of the condition defined in the present invention. The comparative sintered materials 7 and 9 were cBN sintered materials in which the proportion of Al or the Al compound in the base powders was adjusted such that the content of the Al compound in the cBN sintered materials was outside of the condition defined in the present invention. The comparative sintered material 8 was a cBN sintered material in which the cBN particle size was outside of the condition defined in the present invention. The comparative sintered material 10 is a cBN sintered material in which the proportion of MN in the base powders was increased such that the ratio $S_N/S_O$ of the content $S_N$ of nitrogen (N) included in the Al compound of the binder phase of the cBN sintered material to the content $S_O$ of oxygen (O) included in the Al compound of the binder phase of the cBN sintered material was outside of the condition defined in the present invention.

TABLE 1

| | Pre-Treatment Conditions of cBN Base Powder | | |
|---|---|---|---|
| | Thickness of AlN | Heat Treatment Conditions of cBN Particles with AlN Film | |
| Kind | Film formed on cBN Particles using ALD (nm) | Heat Treatment Temperature (° C.) | Heat Treatment Time (min) |
| A | 10 | 1000 | 60 |
| B | 35 | | |
| C | 10 | 400 | |

Regarding each of the sintered materials 1 to 15 according to the present invention and the comparative sintered materials 1 to 11, a cross-section thereof was polished, and an Al mapping image, a nitrogen (N) mapping image, and an oxygen (O) mapping image are obtained using Auger electron spectroscopy (AES) to measure the content ratio of Al in the binder phase of the cBN sintered material, the average particle size of the Al compound in the binder phase, and the ratio $S_N/S_O$ (area ratio) of the content $S_N$ of nitrogen (N) in the Al compound to the content $S_O$ of oxygen (O) in the Al compound.

Tables 2 and 3 shows the results.

The binder phase composition of the cBN sintered material was measured by X-ray diffraction (XRD) analysis.

In addition, regarding the average particle size of the cBN particles and the content ratio of the cBN particles in the cBN sintered material, the cross-sectional structure of the cBN sintered material was observed with a SEM to obtain a secondary electron image. A portion of the cBN particles in the obtained image was binarized and extracted by image processing as illustrated in FIG. 1, and a maximum length of each of the cBN particles is obtained by image analysis as a diameter of the cBN particle. Based on the volume of each particle that is calculated from the diameter, a graph in which the vertical axis represents the cumulative volume percentage (vol %) and the horizontal axis represents the diameter (μm) is drawn. A value corresponding to a cumulative volume percentage of 50% was obtained as a particle size of the cBN particles, and an average value of values that were obtained by processing at least three images in a secondary electron image obtained by observation using a SEM at a magnification of 20000 is obtained as an average particle size [μm] of the cBN particles.

In a case where the average particle size of the cBN particles is 0.3 μm, a visual field region of about 5.0 μm×3.0 μm is desirable as an observation region used for the image processing.

TABLE 2

| Kind | | Kind of Pre-Treatment of cBN Base Powder | cBN Content (Calculated Value) (vol %) | Average Particle size (μm) | Content of Al Compound (vol %) | Composition of Binder Phase (XRD Peak) | Average Particle Size of Al Compound (nm) | Value of Sn/Sq (Area Ratio) |
|---|---|---|---|---|---|---|---|---|
| Sintered | 1 | B | 35 | 0.21 | 8 | TiN, TiB$_2$, AlN, Al$_2$O$_3$ | 163 | 3.7 |
| Material | 2 | A | 78 | 0.09 | 5 | TiN, TiB$_2$, AlN, Al$_2$O$_3$ | 11 | 3.9 |
| according to | 3 | A | 80 | 0.41 | 4 | TiN, TiB$_2$, AlN, Al$_2$O$_3$ | 26 | 4.5 |
| Present | 4 | C | 73 | 0.47 | 1 | TiCN, TiB$_2$, AlN, Al$_2$O$_3$, AlON | 11 | 1.5 |
| Invention | 5 | C | 42 | 0.23 | 6 | TiC, TiB$_2$, AlN, Al$_2$O$_3$ | 86 | 2.1 |
| | 6 | A | 54 | 0.05 | 16 | TiN, TiB$_2$, AlN, Al$_2$O$_3$, WC | 248 | 4.2 |
| | 7 | A | 57 | 0.12 | 7 | TiN, TiB$_2$, AlN, Al$_2$O$_3$ | 96 | 3.6 |
| | 8 | A | 63 | 0.50 | 9 | TiC, TiB$_2$, AlN, Al$_2$O$_3$ | 13 | 3.9 |
| | 9 | A | 59 | 0.43 | 20 | TiN, TiB$_2$, AlN, Al$_2$O$_3$ | 300 | 4.7 |
| | 10 | A | 56 | 0.16 | 18 | TiN, TiCN, TiC, TiB$_2$, AlN, Al$_2$O$_3$ | 182 | 5.0 |
| | 11 | C | 57 | 0.31 | 14 | TiC, TiB$_2$, AlN, Al$_2$O$_3$, SiAlON | 101 | 1.9 |
| | 12 | C | 52 | 0.25 | 7 | TiN, TiB$_2$, AlN, Al$_2$O$_3$, WC | 92 | 1.5 |
| | 13 | C | 47 | 0.07 | 17 | TiN, TiB$_2$, AlN, Al$_2$O$_3$, AlON | 221 | 2.2 |
| | 14 | B | 58 | 0.36 | 10 | TiN, TiB$_2$, AlN, Al$_2$O$_3$ | 99 | 3.4 |
| | 15 | C | 63 | 0.27 | 12 | TiN, TiB$_2$, AlN, Al$_2$O$_3$, AlON | 131 | 1.1 |

TABLE 3

| Kind | | Kind of Pre-Treatment of cBN Base Powder | cBN Content (Calculated Value) (vol %) | Average Particle size (μm) | Content of Al Compound (vol %) | XRD Peak of Al Compound | Average Particle Size of Al Compound (nm) | Value of Sn/So (Area Ratio) |
|---|---|---|---|---|---|---|---|---|
| Comparative | 1 | — | 43 | 0.14 | 0.4 | TiC, TiB$_2$, AlN, Al$_2$O$_3$ | 34 | 1.02 |
| Sintered | 2 | — | 39 | 0.07 | 12 | TiN, TiB$_2$, AlN, Al$_2$O$_3$, WC | 253 | 1.04 |
| Material | 3 | — | 46 | 0.25 | 20 | TiN, TiB$_2$, AlN, Al$_2$O$_3$ | 520 | 1.9 |
| | 4 | — | 53 | 0.33 | 16 | TiC, TiB$_2$, AlN, Al$_2$O$_3$, SiAlON | 116 | 1.03 |
| | 5 | — | 71 | 0.41 | 6 | TiN, TiB$_2$, AlN, Al$_2$O$_3$, AlON | 94 | 1.02 |
| | 6 | B | 21 | 0.14 | 7 | TiN, TiB$_2$, AlN, Al$_2$O$_3$ | 105 | 3.8 |
| | 7 | A | 35 | 0.11 | 40 | TiN, TiB$_2$, AlN, Al$_2$O$_3$ | 264 | 4.8 |
| | 8 | B | 64 | 1.50 | 11 | TiN, TiB$_2$, AlN, Al$_2$O$_3$ | 112 | 3.7 |
| | 9 | A | 66 | 0.30 | 0.4 | TiN, TiB$_2$, AlN, Al$_2$O$_3$ | 44 | 1.2 |
| | 10 | B | 58 | 0.13 | 9 | TiN, TiB$_2$, AlN, Al$_2$O$_3$, WC | 102 | 10.1 |
| | 11 | C | 85 | 0.38 | 3 | TiN, TiB$_2$, AlN, Al$_2$O$_3$ | 109 | 3.9 |

Next, upper and lower surfaces of each of the sintered materials 1 to 15 according to the present invention and the comparative sintered materials 1 to 11 were polished using a diamond grindstone, and were split using a wire-electrical discharge machining device. Further, the split portions of the sintered material were brazed to brazing portions (corner portions) of an insert body made of WC-based cemented carbide including 5 mass % of Co, 5 mass % of TaC, and a balance of WC and having a shape according to ISO CNGA 120408 using a brazing material of an Ag alloy including 26 mass % of Cu, 5 mass % of Ti, and a balance of Ag. Further, the upper and lower surfaces and the outer periphery were polished and horned. As a result, cBN sintered material cutting tools 1 to 15 according to the present invention (hereinafter, also referred to as "tools according to the present invention") and cBN sintered material cutting tools 1 to 11 according to Comparative Examples (hereinafter, referred to as "comparative tools") having an insert shape according to ISO CNGA 120408 were prepared.

Next, each of the various cutting tools was screwed and fixed to a tip portion of an insert holder of tool steel using a fixing jig. In this state, regarding each of the cutting tools 1 to 15 according to the present invention and the comparative tools 1 to 11, an intermittent cutting test was performed under the following cutting conditions.

Work material: a round bar made of carbolized steel (hardness: HRC 61) according to JIS SCr420 with eight longitudinal grooves formed at equal intervals in the longitudinal direction Cutting speed: 200 m/min Depth of cut: 0.10 mm Feed rate: 0.10 mm/rev Condition: dry The number of times of intermittent cutting was counted until chipping or fracturing occurs on an edge tip of the cutting tool, and was evaluated for tool life. The edge tip was observed every 500 times of intermittent cutting to determine whether or not fracturing occurred on the edge tip.

Table 4 shows the test results.

TABLE 4

| Kind | Tool Life (Number of Times of Intermittent Cutting) | Kind | Tool Life (Number of Times of Intermittent Cutting) |
| --- | --- | --- | --- |
| Tool 1 according to Present invention | Chipping (2,000) | Comparative Tool 1 | Fracturing (500) |
| Tool 2 according to Present invention | Chipping (14,000) | Comparative Tool 2 | Fracturing (500) |
| Tool 3 according to Present invention | Chipping (15,000) | Comparative Tool 3 | Fracturing (1,000) |
| Tool 4 according to Present invention | Chipping (14,000) | Comparative Tool 4 | Fracturing (1,000) |
| Tool 5 according to Present invention | Chipping (5,000) | Comparative Tool 5 | Chipping (1,500) |
| Tool 6 according to Present invention | Chipping (5,000) | Comparative Tool 6 | Fracturing (500) |
| Tool 7 according to Present invention | Chipping (7,000) | Comparative Tool 7 | Fracturing (500) |
| Tool 8 according to Present invention | Chipping (8,000) | Comparative Tool 8 | Fracturing (1,000) |
| Tool 9 according to Present invention | Chipping (7,500) | Comparative Tool 9 | Fracturing (1,000) |
| Tool 10 according to Present invention | Chipping (8,500) | Comparative Tool 10 | Fracturing (500) |
| Tool 11 according to Present invention | Chipping (8,000) | Comparative Tool 11 | Fracturing (500) |
| Tool 12 according to Present invention | Chipping (8,000) | | |
| Tool 13 according to Present invention | Chipping (7,500) | | |
| Tool 14 according to Present invention | Chipping (8,500) | | |
| Tool 15 according to Present invention | Chipping (8,500) | | |

Based on the results shown in Table 4, the following was found. In the cBN sintered material according to the present invention, the average particle size of the cBN particles was 0.5 μm, the content ratio of the cBN particles in the cBN sintered material was 35 vol % to 80 vol %, the binder phase included 1.0 vol % to 20 vol % of the Al compound, the average particle size of the Al compound present in the binder phase was 300 nm or less, and the value of $S_N/S_O$ (area ratio) was 1.1 to 5. Therefore, the initiation or propagation of cracks from the Al compound particles was less likely to occur, a local and excessive reaction between the cBN particles and the binder phase in the sintered material was suppressed, and the amount of an oxide was small. Therefore, the interfacial adhesion strength between the cBN particles and the binder phase was improved, and the toughness was excellent.

Accordingly, in each of the tools 1 to 15 according to the present invention, the tool life was long during cutting of high hardness steel where the edge tip was at a high temperature and under a high load, only chipping occurred and critical fracturing did not occur on the edge tip, and excellent toughness and fracturing resistance were exhibited.

On the other hand, it is clear that, in each of comparative cutting tools 1 to 11, the cBN sintered material did not satisfy the conditions defined in the present invention, and thus critical fracturing occurred within a relatively short period of time such that the tool life ended.

INDUSTRIAL APPLICABILITY

As described above, the cBN tool according to the present invention has excellent fracturing resistance, and thus is applicable not only to cutting of high hardness steel but also to cutting under various cutting conditions. The cBN tool according to the present invention can satisfactorily cope with the improvement of the performance of cutting apparatuses, power saving and energy saving during cutting, and a reduction in costs.

The invention claimed is:

1. A cubic boron nitride sintered material cutting tool comprising a cutting tool body that is made of a sintered material including cubic boron nitride particles and a binder phase, wherein:
    (a) an average particle size of the cubic boron nitride particles is 0.5 μm or less and a content ratio of the cubic boron nitride particles in the sintered material is 35 vol % to 80 vol %; and
    (b) the binder phase includes 1.0 vol % to 20 vol % of an Al compound, an average particle size of the Al compound present in the binder phase is 300 nm or less, and a value of a ratio $S_N/S_O$ as an area ratio of a content $S_N$ of nitrogen N included in the Al compound to a content $S_O$ of oxygen O included in the Al compound is 1.1 to 5.

2. The cubic boron nitride sintered material cutting tool according to claim 1,
    wherein a content ratio of the cubic boron nitride particles in the sintered material is 45 vol % to 80 vol %.

3. The cubic boron nitride sintered material cutting tool according to claim 1,
    wherein a content ratio of the cubic boron nitride particles in the sintered material is 70 vol % to 80 vol %.

4. The cubic boron nitride sintered material cutting tool according to claim 1,
    wherein an average particle size of the cubic boron nitride particles is 0.05 μm to 0.35 μm.

5. The cubic boron nitride sintered material cutting tool according to claim 1,
    wherein an average particle size of the Al compound present in the binder phase is 10 nm or more.

* * * * *